United States Patent [19]

Whiteley

[11] 4,068,143
[45] Jan. 10, 1978

[54] DISCOIDAL WINDING FOR DYNAMOELECTRIC MACHINES
[75] Inventor: Eric Whiteley, Peterborough, Canada
[73] Assignee: General Electric Company, Schenectady, N.Y.
[21] Appl. No.: 534,058
[22] Filed: Dec. 18, 1974
[30] Foreign Application Priority Data
Dec. 19, 1973 Canada ................................. 188535
[51] Int. Cl.² ............................................... H02K 1/22
[52] U.S. Cl. ..................................... 310/268; 310/198
[58] Field of Search ................... 310/268, 42, 46, 178, 310/43, 68, 45, 237, 179, 180, 195, 198, 200-208
[56] References Cited
U.S. PATENT DOCUMENTS

| 2,502,068 | 3/1950 | Anderson | 310/268 |
|---|---|---|---|
| 3,436,571 | 4/1969 | French | 310/268 |
| 3,441,763 | 4/1969 | Parignani | 310/268 |
| 3,512,025 | 5/1970 | Quellet | 310/208 |
| 3,558,947 | 1/1971 | Burr | 310/268 |
| 3,790,835 | 2/1974 | Takeda | 310/268 |
| 3,845,339 | 10/1974 | Merkle | 310/68 |
| 3,863,336 | 2/1975 | Noto | 310/43 |

FOREIGN PATENT DOCUMENTS

| 771,292 | 11/1967 | Canada | 310/268 |
|---|---|---|---|
| 858,668 | 12/1970 | Canada | 310/268 |

Primary Examiner—R. Skudy
Attorney, Agent, or Firm—Vale P. Myles

[57] ABSTRACT

A discoidal winding structure for dynamoelectric machines has its conductors bonded together by a resinous material. The structure has a flat disc portion containing the coil sides and outer and inner ring portions containing the coil end-heads and other end connections. The coils have their sides and end-heads of shapes which permit them to nest closely together in an annular array of overlapping coils.

16 Claims, 10 Drawing Figures

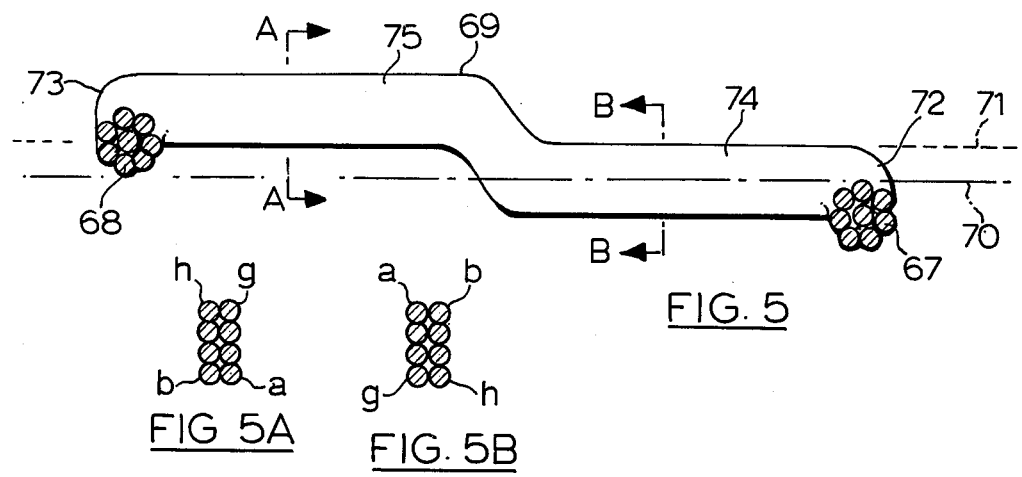
FIG. 5
FIG 5A
FIG. 5B
FIG. 6A
FIG. 6B
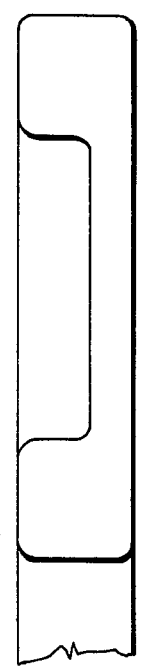
FIG. 6C

DISCOIDAL WINDING FOR DYNAMOELECTRIC MACHINES

BACKGROUND OF THE INVENTION

This invention relates to discoidal windings for axial gap dynamoelectric machines, and in particular, to coils for such windings.

Discoidal windings of the general character related to this invention consist essentially of a winding laid out in a flat pattern and having its conductors bonded together by means of a resinous material. The resin bonded winding is a unitary structure in the configuration of an annular disc located between an inner and an outer ring. The disc is a flat and relative thin member which contains the sides of the coils and the rings are usually somewhat thicker because they contain the coil end-heads and connections.

Canadian Pat. No. 771,292, issued Nov. 7, 1967, Eric Whiteley and Canadian Pat. No. 858,668, issued Dec. 15, 1970, Alastair H. Carter, disclose dynamoelectric machines having discoidal winding structures, in these two cases discoidal rotors. Although the windings used in these machines serve the purposes intended for them, the coils of both have rather long end-heads. End-heads longer than absolutely necessary increase the amount of copper in the winding, and this in turn increases the $I^2R$ losses or heat that must be removed from the winding. The long end-heads are also wasteful of copper and resin, increase the physical size of the winding structure, and decrease the efficiency of the machine. There is, therefore, considerable room for improvements in discoidal windings.

The object of this invention is to provide improved coils and windings for discoidal winding structures.

SUMMARY OF THE INVENTION

In accordance with this invention, a discoidal winding structure for an axial gap dynamoelectric machine has a thin annular disc portion containing the coil sides and enlarged ring portions on the inner and outer edges of the disc containing the coil end conductors, all of which portions constitute a unitary structure of winding conductors bonded together with a resinous material. The winding itself consists of a plurality of coils laid in a flat circular pattern overlapping in the lay, each coil having one or more turns. Each coil has its sides disposed radially at approximately one pole pitch, has at least one end-head joining one of the corresponding ends of the sides, and has conductors for connecting the other corresponding ends of the sides to other coils of the winding. According to the invention, each coil has one side and a significant length of the end-head thereon lying on one side of a plane, the other side and a significant length of the end-head thereon lying on the other side of the plane, and a cranked end-head portion traversing the plane and interconnecting the lengths of end-head. In the case of a single turn coil, the end-head may join either the divergent or the convergent ends of the coil sides; in the case of a multiple turn coil, an outer end-head will join the divergent ends of the sides and an inner end-head will join the convergent ends of the sides, and both end-heads will be of like configuration although of different lengths. This winding structure is generally symmetrical in the relationship of the ring and disc portions. It is also possible, and indeed desirable sometimes, to offset one or both of the coil end-heads laterally from the median plane and thereby obtain an asymmetrical winding structure.

DESCRIPTION OF THE DRAWINGS

A better understanding of the invention may be had from the following description taken with the accompanying drawings, in which:

FIG. 5 is a view of an end-head of a coil showing the sides thereof in section;

FIGS. 5A and 5B are sections taken on A—A and B—B of FIG. 5; and

FIGS. 6A, 6B and 6C shows three different discoidal winding structures in cross section.

DETAILED DESCRIPTION

Figures 1, 2:
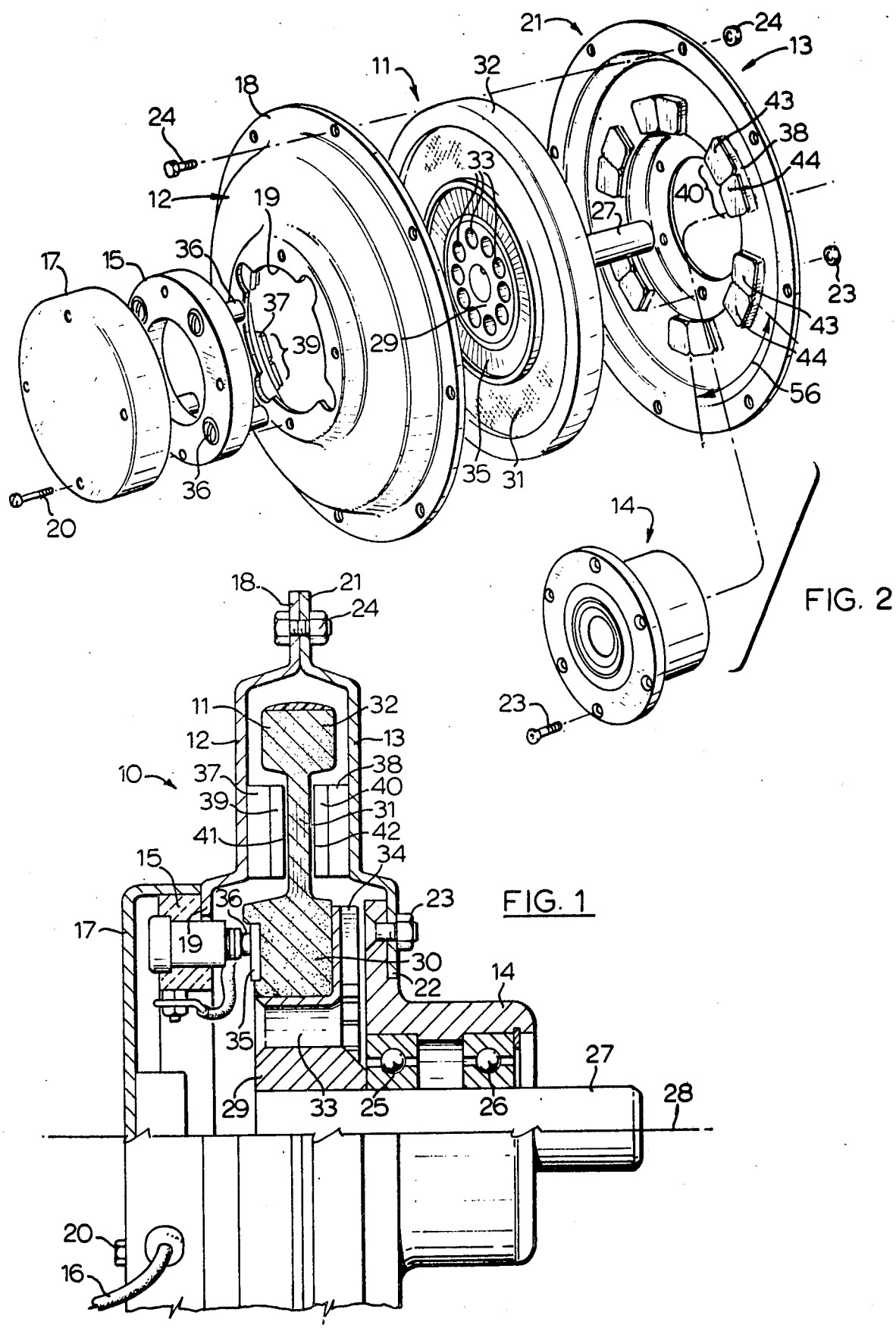
FIG. 1 is a view in elevation of a dynamoelectric machine incorporation a rotor constructed according to the invention.
FIG. 2 is an exploded view in perspective of the machine shown in FIG. 1.

In FIGS. 1 and 2 there is shown a dynamoelectric machine 10 embodying the invention. This machine is illustrated as a DC machine, and it may be used either as a motor or as a generator. However, for purposes of the description to follow the machine is intended to be used as a motor, and it will be referred to hereinafter as a motor. Machine 10 consists essentially of a rotor 11 supported for rotation in a stator having housing numbers 12 and 13, rotor supporting structure 14, brush bear 15, leads 16 and a cover 17 for the brush gear.

Housing members 12 and 13 are dish-shaped members made of a magnetic material such as mild steel and serve as the yoke of the magnetic field circuit and provide a substantial portion of the enclosure for the machine. Member 12 has an outer edge portion 18, an open center defined by the inner edge portion 19, and has the brush gear 15 and cover 17 therefore, secured to this inner edge portion by means of a number of bolts 20. Member 13 has an outer edge portion 21, an open center defined by the inner edge portion 22, and has the bearing retaining member 14 secured to this inner edge portion by means of a number of bolts 23. Members 12 and 13 are secured together at their outer edge portions 18 and 21 by means of a number of bolts 24. The rotor supporting structure includes member 14 and the ball bearings 25 and 26 which are mounted inside the member and carry the shaft 27 of rotor 11. The bearings support the rotor for rotation on its axis 28. Leads 16 provide a circuit for connecting the brushes on gear 15 to a power source.

Rotor 11 resembles a disc wheel. It consists of the following annular portions disposed concentricaly about axis 28; a shaft 27; a hub 29 secured to shaft 27; an inner ring portion 30 secured to the hub; a disc portion 31 integral with the inner ring portion; and an outer ring portion 32 integral with the disc portion. Disc portion 31 and ring portions 30 and 32 consist of a plurality of coils nested together in an annular array and bonded together by means of a resinous material, such as an epoxy resin, to provide a strong and rigid discoidal rotor structure wherein the electrical conductors of the coils reinforce the resinous mass mechanically. The structure of the rotor and its windings will be described in more detail later. The hub 29 serves as a means for supporting the discoidal structure on the shaft for rotations in a plane normal to axis 28 and also as a fan for circulating a cooling medium counter-clockwise around the discoidal structure, the hub having a number of axial fluid flow passages 33 and a number of radially disposed blades 34 for impelling the fluid outwardly. In the machine illustrated, rotor 11 is the armature, and it has a commutator consisting of an annular array of segments 35 connected to the various coil ends and bonded to the inner ring portion 30 by means of the resin that bonds the coils together. Brush gear 15 carries a number of conductive brushes 36 which bear against the commutator and thereby connect the armature winding to leads 16.

FIG. 1 shows one pair of complementary poles, i.e., one pair of the six pairs of poles provided in the machine shown in FIGS. 1 and 2. Each pair of poles consists of magnetic spacing members 37 and 38 attached to housing members 12 and 13 respectively and permanent magnets 39 and 40 attached to members 37 and 38 respectively, components 37 and 39 being regarded as one pole structure and components 38 and 40 as the other pole structure of the pair. Each pole structure 37, 39 projects from housing member 12 and terminates in a flat pole face 41 on the magnet lying in a plane normal to axis 28 and spaced slightly from the flat surface on disc portion 31 of the rotor. Each pole structure 38, 40 projects from housing member 13 and terminates in a flat pole face 42 on the magnet lying in a plane normal to axis 28 and spaced slightly from the other flat surface on disc portion 31 of the rotor. Pole faces 41 and 42 are located directly opposite each other on opposite sides of the rotor disc portion with small gaps left between the rotor disc portion and the pole faces. These gaps allow the rotor freedom of rotation between the various pairs of poles. Spacers 37 and 38 may be pieces of a mild steel welded to the housing members and the magnets may be bonded to them by means of an epoxy or a methyl-2-cyanoacrylate (Eastman 910) adhesive. In the interest of manufacturing economy, magnets 39 and 40 will usually be flat on both sides and of uniform thickness, in which case the spacers will be shaped to position the magnets for the required distance between their pole face 41, 42. Pole faces 41, 42 are of opposite magnetic polarity so that the permanent magnets 30, 40 aid in providing magnetic flux in the gap between their faces, that is, the gap containing the rotor disc. Since spacers 37, 39 and housing members 12, 13 are made of magnetic materials, they provide return flux paths.

In very small machines, magnets 39, 40 will probably be single permanent magnet units. However, in the larger machines, each one of the magnets 39 and 40 may be a mosaic of unit permanent magnets of the nature described and claimed in the applicants copending Canadian application, Ser. No. 181,935, filed Sept. 24, 1973, Eric Whiteley (also see corresponding U.S. application Ser. No. 502,007, filed Aug. 30, 1974. In FIG. 2, each permanent magnet 40 is shown as a mosaic of two unit magnets 43, 44. Magnets 39 are also mosaics of two units each.

Figure 3:
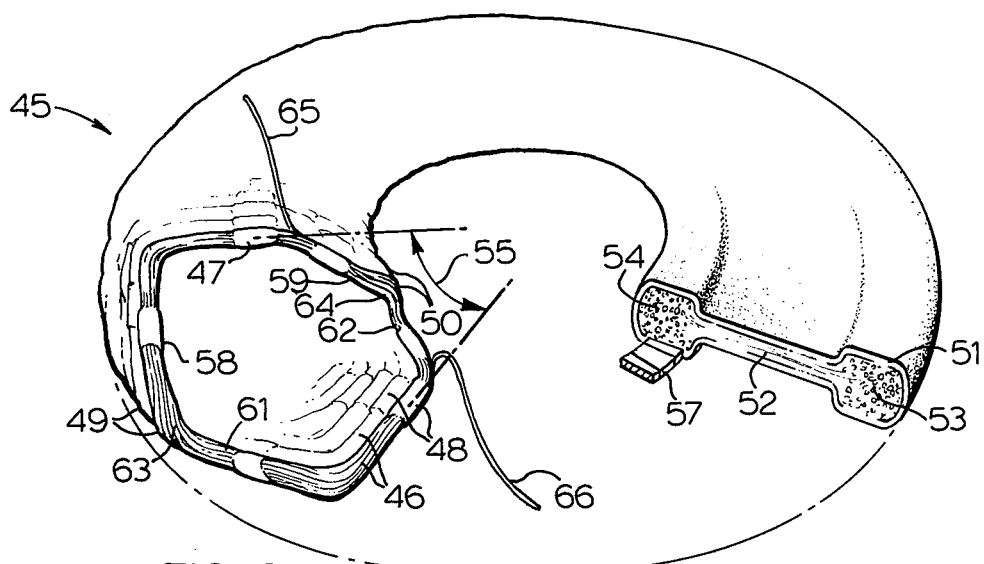
FIG. 3 is a perspective view of a winding structure having a portion broken away to show the coils and the lay thereof.

In FIG. 3, there is shown a discoidal winding structure 45 suitable for use in either an AC or DC machine, for example, in the armature of the machine illustrated in FIGS. 1 and 2. This winding structure consists essentially of a plurality of multiple turn coils 46 laid in a flat circular array with the coil sides 47 overlapping sides 48 and the outer and inner end-heads 49 and 50 respectively nested together. The coils are identical, or as nearly identical as it is possible to make them, and according to the invention their shape is such that they minimize copper and yet fit well together in a compact winding. The shape and lay of the coils as they appear during the winding operation is clearly shown in FIG. 3. Once the coils are in place in the winding, the sides of the coils are pressed together to a specified coil side thickness and the entire winding is then encapsulated in a resinous material 51, such as, an epoxy resin, that will flow between the conductors. The resin may be reinforced with glass fibers in selected regions to improve the encapsulated structure. The resulting product is a discoidal winding structure of electrical conductors bonded together by means of a resinous material. When this structure is used as the rotor of a machine, it must be rigid and strong enough to be self-supporting under operating conditions; however, when it is attached to a stator structure, it may be somewhat less robust. The resin bonded winding structure is in the configuration of an annular disc portion 52 located between enlarged outer and inner ring portions 53, 54 respectively, and the three portions will be coaxial in the case of a rotor. Disc portion 52 is relatively thin and contains the coil sides 47, 48 of coils 46, the sides being radial and at a span 55 of approximately one pole pitch, a pole pitch being the span between two adjacent poles of the machine as indicated at 56 in FIG. 2. Heads 49 on the diverging ends of the sides are located in the outer ring portion 53 and heads 50 on the converging ends of the sides are located in the inner ring portion 54. If the discoidal winding structure shown in FIG. 3 is to be used as the armature of a DC machine, it will be provided with a commutator 57 and structure capable of supporting it for rotation.

Coil 46 will now be described in more detail with reference to FIG. 4. It is to be noted that the coil is shown in this figure on a forming block 60A having a flat surface 60 which will be referred to hereinafter as plane 60. This block is included for the purpose of showing the sides and end-heads of the coil in relation to the plane. Coil 46 has one side 47 and significant lengths 58, 59 of the end-heads 49 and 50 respectively lying on one side of plane 60, the other side 48 and significant lengths 61, 62 of the end-heads lying on the other side of plane 60, a cranked portion 63 traversing plane 60 and interconnecting lengths 58 and 61, and another cranked portion 64 traversing plane 60 and interconnecting lengths 59 and 62. In the preferred form of coil 46, sides 47 and 48 will be straight and of equal radial length, lengths 58 and 61 will be equal and each about half the length of end-head 49, lengths 59 and 62 will be equal and each about half the length of end-head 50, and the cranked portion 63 and 64 will be alike and in the middle of the respective end-heads. The outer end-head 49 will usually be curved to conform with the curvature of the outer ring portion 53 of the winding structure. The inner end-head 50 may also be curved depending on the curvature of the inner ring portion 54. It is to be noted from FIGS. 3 and 4 that the coils are laid in place with the sides 47 overlaying the sides 48, the lengths 58 and 59 overlaying the lengths 61 and 62, and the cranked portions 63 and 64 transposing the lay. Hence, the relationships of the plane to the coils is maintained in the winding until the coil sides are pressed together, after which sides 47 are partially interposed between sides 48. Pressing the coil sides together also reduces the thickness of the disc portion of the winding so that it is now considerably thinner than the ring portions, for example, about one half the thickness of the ring portions. Hence, the final structure is a thin annular disc portion bounded by enlarged ring portions.

Figure 4:
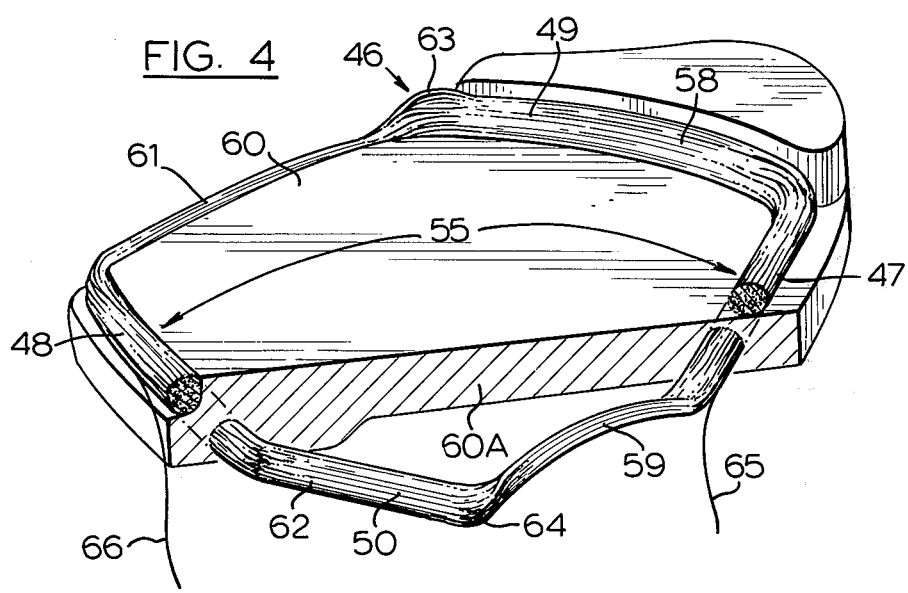
FIG. 4 is a perspective view of a coil.

The lay of the conductor strands or turns of a coil is best illustrated in FIG. 4. As the coil is wound, the strands in sides 47 and 48 bunch together in bundles that are somewhere near round, and the strands in end-heads 49 and 50 spread out in directions away from plane 60 in flat layers that stand out in opposite directions from the plane. Endhead lengths 58 and 59 stand on one side of the plane with their flat sides at an angle to the plane approaching a right angle, and lengths 61 and 62 stand on the other side of the plane in a similar angular relation to the plane. Each one of the cranked portions 63 and 64 is, in effect, a twist in the flat layer of strands, a twist that transposes the layer of strands from one side of the plane to the other while maintaining the strands in the same positions relative to the plane. In other words, the strand next to the plane on one side of the twist is also next to the plane on the other side of the twist, and so forth. This feature is illustrated by the sections of FIGS. 5A and 5B for an eight strand coil having offset end-head and wherein the strands are identified by the small letters a to h, respectively. The shape of the bundle of strands in sides of this coil is illustrated at 67 and 68 in FIG. 5. The coil configurations discussed in this paragraph are the coils as wound, that is, the shape of a coil before it is assembled in a winding. However, once the coils have been assembled in a winding and the winding pressed into a desired shape, the coils will have changed their shape somewhat.

In FIGS. 3 and 4 the coil ends 65 and 66 are shown coming off the sides at the inner end-head. This is a convenient place to bring them out when they are to be connected to a commutator 57 located on the inner ring portion. It will be appreciated that in a multiple turn coil, the ends can be brought out at either end-head, the location selected depending upon the connections to be made. However, in the case of a single turn coil, only one of the end-heads is provided and the coil ends are simply extensions of the coil sides. A single turn coil for a discoidal armature winding is shown in the aforementioned Whiteley patent. This particular coil has much longer end-heads than the coil shown in FIGS. 3 and 4.

The winding structure shown in FIG. 3 has its inner and outer ring portions symmetrical with respect to its disc portion. Although a symmetrical construction appears to have many advantages, an asymmetrical construction may well be more suitable for certain applications. In an asymmetrical construction, one or both of the ring portions are offset with respect to the disc portion, the offset being in the same or opposite directions. To obtain an offset ring portion, the end-heads in that portion are offset laterally from the plane referred to in FIG. 4. FIG. 5 illustrates how an end-head may be offset.

In FIG. 5, the coil sides 67 and 68 lie on opposite sides of a plane 70 corresponding with plane 60 of FIG. 4, and the outer end-head 69 (the longer of the two end-heads) is offset laterally from this plane and disposed symmetrically in another plane 71 which is spaced from and parallel to plane 70. The coil is carried from plane 70 to plane 71 by means of two very short bent portions 72 and 73 so that end-head lengths 74 and 75 lie on opposite sides of planes 71; otherwise the sides and end-head are the same shape as they are in FIGS. 3 and 4. Coil portions 72 and 73 are bent in the same direction with respect to plane 70, and the extent of the bend depends upon how far the ring portion is to be offset with respect to the disc portion. For the symmetrical configuration shown in FIG. 6A, there are no bent portions 72 and 73, and planes 71 and 70 coincide; for the partially offset configuration shown in FIG. 6B, plane 70 lies inside end-head length 74 and length 75 lies well to one side of plane 70 as shown in FIG. 5; and for the fully offset configuration shown in FIG. 6C, the entire end-head 69 lies on one side of plane 70 with length 74 adjacent the plane. The extent of the asymmetry shown in FIG. 6B can vary from FIG. 6A to FIG. 6C or in other words, there can be numerous partially offset configurations in which the ring portion projects farther from one side of the disc portion than it does from the other side thereof. In FIG. 6C the entire projection of the ring portions is to the left of the disc portion, the right side presenting a flat surface.

One end-head may be offset in the way just described in connection with FIGS. 5 and 6B, 6C and the other left symmetrical with respect to plane 70, or both end-heads may be offset in the same direction or opposite directions with respect to plane 70. Only the outer or longer end-head 69 is shown in FIG. 5; the inner or shorter end-head has not been shown in the interest of drawing clarity.

A coil may be wound with an offset end-head of the nature shown in FIG. 5, or it may be wound with a symmetrical end-head as in FIG. 4 and the end-head then offset by press forming. In some windings composed of multiple turn coils of light gauge conductors, it may be advantageous to form the winding from symmetrical coils of the type shown in FIG. 4 and then offset the end-heads of al the coils in the winding in one press forming operation. This operation may be combined with the operation used to press the coil sides together prior to resin impregnation. In other words, by the use of suitable forming tools, the coil sides may be pressed together and the end-heads offset during one stroke of the press.

Although the description has been directed to multiple turn coils, it is believed that one skilled in the art can readily apply the invention to single turn coils of one or more strands per turn. A single turn coil has only one end-head; otherwise the coils are the same in so far as the invention is concerned.

The discoidal winding structure described has coils in which the end-heads nest well together and the strands in the sides are in bundles. This type of end-head is also well-suited for use in a coil where the sides have their strands spread out more at the outer end-head than at the inner end-head so the winding structure has a disc portion that is thinner at the outer ring portion than it is at the inner ring portion. Coils of this nature are disclosed in Canadian application, Ser. No. 188,512, filed Dec. 19, 1973 by Eric Whiteley.

Discoidal winding structures constructed according to the invention are well-suited for use as rotors for dynamoelectric machines as shown in FIGS. 1 and 2. This type of winding structure is also well-suited for use as the AC winding on the stator of a synchronous machine having permanent magnets on its rotor. Synchronous machines of this type are disclosed in Canadian application Ser. No. 196,860, filed Apr. 4, 1974 by Eric Whiteley (also see corresponding U.S. application Ser. No. 556,995, filed Mar. 10, 1975).

What is claimed as new and desired to be secured by Letters Patent of the United States is:

1. A coil for a discoidal winding structure for use in an axial gap dynamoelectric machine; said winding structure consisting essentially of a plurality of said coils overlapped in a circular array, interconnected electrically and bonded together with a bonding medium to provide a unitary structure having an annular disc portion containing the coil sides and ring portions on the inner and outer edges of the disc containing the coil end-heads and coil end conductors; said coil having a pair of sides disposed radially at approximately one pole pitch, at least one end-head joining one of the corresponding ends of the coil sides, and conductors on the other corresponding ends of said coil sides completing the coil circuit; said coil characterized by one coil side and a significant length of the end-head thereon lying on one side of a plane, the other coil side and a significant length of the end-head thereon lying on the other side of said plane, and a cranked end-head portion traversing said plane and interconnecting said lengths of end-head.

2. A coil as recited in claim 1 having a stranded single turn with its end-head located in the outer ring portion and its conductor ends in the inner ring portion.

3. A coil as recited in claim 1 having a stranded single turn with its end-head located in the inner ring portion and its conductor ends in the outer ring portion.

4. A coil as recited in claim 1 having a plurality of conductor turns; a relatively long outer end-head; a relatively short inner end-head; and characterized by one coil side and the significant lengths of the outer and inner end-heads thereon lying on one side of the plane, the other coil side and the significant lengths of the outer and inner end-heads thereon lying on the other side of the plane, and a cranked portion on each end-head traversing the plane in the same direction.

5. A coil as recited in claim 4 further characterized by said end-heads being symmetrical with respect to said plane.

6. A coil as recited in claim 4 further characterized by having at least one end-head offset laterally from said plane and symmetrical with respect to another plane spaced from and parallel to said plane.

7. A coil as rectied in claim 4 further characterized by the portions of significant length in the outer end-head being curved outwardly to conform with the curvature of the outer ring portion of the winding structure.

8. A coil as recited in claim 7 further characterized by the portions of significant length in the inner end-head being straight.

9. A coil as recited in claim 7 further characterized by the portions of significant length in the inner end-head being curved to conform with the curvature of the inner ring portion of the winding structure.

10. A coil as recited in claim 1 having coil sides of equal radial length.

11. A coil as recited in claim 1 having said significant lengths of each end-head about equal to one half the length of the end-head.

12. A discoidal winding structure for an axial gap dynamoelectric machine consisting essentially of a plurality of coils overlapped in a circular array and bonded together with a bonding medium to provide a unitary structure having an annular disc portion containing the coil sides and ring portions on the inner and outer edges of the disc containing the coil end-heads and coil end conductors, said coil having a pair of sides disposed radially at approximately one pole pitch and end-heads joining the corresponding ends of the coil sides, said coil having a relatively long outer end-head and a relatively short inner end-head, said coil having one coil side and a significant length of the end-head thereon lying on one side of a plane, the other coil side and a significant length of the end-head thereon lying on the other side of said plane, and a cranked end-head portion traversing said plane and interconnecting said lengths of end-head, said one sides of the coils being interposed respectively between two of said other sides of adjacent coils.

13. A coil for a discoidal winding structure for use in an axial gap dynamoelectric machine, said winding structure having an annular disc portion containing the coil sides and inner and outer ring portions containing the coil end-heads and coil end conductors, said coil comprising a pair of coil sides disposed radially at approximately one pole pitch on opposite sides of a plane, at least one end-head joining one of the corresponding ends of said coil sides, and conductors on the other corresponding ends of said coil sides completing the coil circuit, said end-head having first and second portions of major length connected to the respective coil sides and disposed on opposite sides of an adjacent plane and interconnected by a short cranked portion traversing said adjacent plane.

14. A coil for a discoidal winding structure for use in an axial gap dynamoelectric machine, said winding structure having an annular disc portion containing the coil sides and inner and outer ring portions containing the coil end-heads and coil end conductors, said coil comprising a pair of coil sides disposed radially at approximately one pole pitch on opposite sides of a plane, at least one end-head joining one of the corresponding ends of said coil sides, said conductors on the other corresponding ends of said coil sides completing the coil circuit, said end-head having first and second portions of major length disposed substantially parallel to the plane with one portion offset differently than the other portion from the plane and with both portions running along the plane, and said end-head also having a short cranked portion located between said long portions.

15. A coil as recited in claim 14 characterized by said end-head portions of major length being disposed on opposite sides of said plane adjacent thereto and said cranked portion traversing the plane.

16. A coil as recited in claim 14 characterized by said coil being a stranded coil having the strands in each coil side bunched together in a substantially round bundle and the strands in the end-head spread out in a flat layer disposed angularly with respect to said plane.

* * * * *